United States Patent
Aberg et al.

(10) Patent No.: US 10,493,459 B2
(45) Date of Patent: Dec. 3, 2019

(54) GYRATORY CRUSHER AND SLIDE BEARING LINING

(71) Applicant: SANDVIK INTELLECTUAL PROPERTY AB, Sandviken (SE)

(72) Inventors: Niklas Aberg, Sodra Sandby (SE); Jan Johansson, Arlov (SE); Patric Malmqvist, Svedala (SE); Arvid Svensson, Bunkeflostrand (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 1261 days.

(21) Appl. No.: 14/417,348

(22) PCT Filed: Jun. 19, 2013

(86) PCT No.: PCT/EP2013/062762
§ 371 (c)(1),
(2) Date: Jan. 26, 2015

(87) PCT Pub. No.: WO2014/016059
PCT Pub. Date: Jan. 30, 2014

(65) Prior Publication Data
US 2015/0290649 A1 Oct. 15, 2015

(30) Foreign Application Priority Data
Jul. 27, 2012 (EP) .................................... 12178291

(51) Int. Cl.
*B02C 2/00* (2006.01)
*B02C 2/06* (2006.01)
(Continued)

(52) U.S. Cl.
CPC ................ *B02C 2/047* (2013.01); *B02C 2/00* (2013.01); *B02C 2/04* (2013.01); *B02C 2/06* (2013.01); *F16C 33/06* (2013.01)

(58) Field of Classification Search
CPC .... B02C 2/00; B02C 2/02; B02C 2/04; B02C 2/042; B02C 2/045; B02C 2/047; B02C 2/06; F16C 33/06
(Continued)

(56) References Cited

U.S. PATENT DOCUMENTS 2,833,486 A 5/1958 MacLeod
4,034,922 A * 7/1977 Coxhill ..................... B02C 2/06
241/213
(Continued)

FOREIGN PATENT DOCUMENTS

BE 560289 A 2/1958
RU 103749 U1 4/2011
(Continued)

*Primary Examiner* — Shelley M Self
*Assistant Examiner* — Smith Oberto Bapthelus
(74) *Attorney, Agent, or Firm* — Corinne R. Gorski (57) ABSTRACT

A gyratory crusher includes an eccentric having an inner slide bearing surface and an outer slide bearing surface, the inner slide bearing surface defining, together with an opposing slide bearing surface, an inner slide bearing. The outer slide bearing surface defines, together with another opposing slide bearing surface, an outer slide bearing. The eccentric is rotatably connected to a crusher frame so as to allow a rotation about an eccentric axis of rotation, which is fixed relative to the frame. The eccentric axis of rotation is defined by one of the inner and outer slide bearings. The inner slide bearing has a total height-to-diameter quotient (H1/D1) of less than 1.0.

13 Claims, 5 Drawing Sheets

(51) Int. Cl.
*B02C 2/04* (2006.01)
*F16C 33/06* (2006.01)

(58) Field of Classification Search
USPC .................................................. 241/207–216
See application file for complete search history.

(56) References Cited

U.S. PATENT DOCUMENTS

| | | |
|---|---|---|
| 4,892,257 A | 1/1990 | Stoeckmann et al. |
| 5,152,468 A | 10/1992 | Virtamo et al. |
| 2002/0074437 A1 | 6/2002 | Savolainen |

FOREIGN PATENT DOCUMENTS

| | | |
|---|---|---|
| RU | 2452571 C2 | 6/2012 |
| SU | 795555 A1 | 1/1981 |
| WO | 2005075082 A1 | 8/2005 |
| WO | 2008103096 A1 | 8/2008 |
| WO | 2011005169 A1 | 1/2011 |

\* cited by examiner

GYRATORY CRUSHER AND SLIDE BEARING LINING

RELATED APPLICATION DATA

This application is a § 371 National Stage Application of PCT International Application No. PCT/EP2013/062762 filed Jun. 19, 2013 claiming priority of EP Application No. 12178291.6, filed Jul. 27, 2012.

FIELD OF THE INVENTION

The present invention relates to a gyratory crusher comprising a crushing head on which a first crushing shell is mounted; and a frame on which a second crushing shell is mounted, which second crushing shell defines, together with the first crushing shell, a crushing gap, the crushing head being arranged to, when the crusher is operated, execute a gyratory movement for crushing of material that is introduced in the crushing gap. The invention also relates to a slide bearing lining for such a crusher.

BACKGROUND OF THE INVENTION

A gyratory crusher of the kind stated above can be used for crushing, for example, ore and rock material into smaller size. WO 99/22869 discloses an exemplary gyratory crusher, in which a crushing head is mounted on a gyrating vertical shaft. The vertical position of the vertical shaft can be adjusted, so as to allow adjustment of the width of the crushing gap in which material is crushed.

There is a need to reduce the weight of gyratory crushers. There is also a need to reduce the investment and operation costs of such crushers, and to increase their service interval.

SUMMARY OF THE INVENTION

It is an object of the present invention to solve, or at least mitigate, parts or all of the above mentioned problems.

To this end, there is provided a gyratory crusher comprising a crushing head on which a first crushing shell is mounted; a frame on which a second crushing shell is mounted, which second crushing shell defines, together with the first crushing shell, a crushing gap; and an eccentric having an inner slide bearing surface and an outer slide bearing surface, the inner slide bearing surface defining, together with an opposing slide bearing surface, an inner slide bearing, and the outer slide bearing surface defining, together with another opposing slide bearing surface, an outer slide bearing, the eccentric being rotatably connected to the frame so as to allow a rotation about an eccentric axis of rotation which is fixed relative to the frame, the eccentric axis of rotation being defined by one of said inner and outer slide bearings, the crushing head being rotatably connected to the eccentric so as to allow a rotation about a crushing head axis which is fixed relative to said eccentric, the crushing head axis of rotation being defined by the other of said inner and outer slide bearings, the crushing head thereby being arranged to, when the crusher is operated, execute a gyratory movement about the eccentric axis for crushing of material that is introduced in the crushing gap, wherein the inner slide bearing has a total height-to-diameter quotient, $H1/D1$, of less than 1.0. Preferably the height-to-diameter quotient, $H1/D1$, of the inner slide bearing is less than 0.85, more preferably less than 0.75, and even more preferably less than 0.65. Preferably, the height-to-diameter quotient, $H1/D1$, is larger than 0.35. Thereby, the weight of the crusher may be significantly reduced. Using such a total height-to-diameter quotient $H1/D1$ of the inner slide bearing, the total weight of the entire crusher may be reduced by about 2-8%, compared to known crushers, without sacrificing the load resistance of the inner slide bearing. Such a weight reduction is of particular value for mobile crushers, which may be adapted to be transported by e.g. lorry. Such a total height-to-diameter quotient $H1/D1$ may also reduce the investment and operating costs of crushers, as will be elucidated in detail further below.

According to one embodiment, the outer slide bearing has a total height-to-diameter quotient, $H2/D2$, of less than 0.5. Preferably the height-to-diameter quotient, $H2/D2$, of the outer slide bearing is less than 0.45, and even more preferably less than 0.40. Preferably, the height-to-diameter quotient, $H2/D2$, is larger than 0.15. Thereby, the weight of the crusher may be reduced even further. Using such a total height-to-diameter quotient of the outer slide bearing, the total weight of the entire crusher may be reduced by about 4-8%, compared to known crushers, without sacrificing the load resistance of the outer slide bearing.

According to one embodiment, in which the crushing head is vertically slidable relative to the frame so as to allow changing the width of the crushing gap, a quotient, $HL/D$, between the maximum vertical travel length of the crushing head and the horizontal diameter of the crushing head exceeds 0.16. Preferably the quotient, $HL/D$, between the maximum vertical travel length and the horizontal diameter of the crushing head exceeds 0.18, and even more preferably exceeds 0.24. Instead of, or in combination with a weight reduction, the lower bearing height may be benefitted from by increasing the crushing head travel length. Thereby, it is possible to use thicker crushing shells, which enables an increase of the crushing power and/or an increase in the replacement interval of the crushing shells.

According to an embodiment, the eccentric axis of rotation is defined by the outer slide bearing, and the crushing head axis of rotation is defined by the inner slide bearing. Such an arrangement is commonly used in crushers having a top bearing arranged in a top spider.

According to one embodiment the gyratory crusher comprises a hydraulically movable crushing head shaft piston supporting a crushing head shaft on which the crushing head is mounted. An advantage of this embodiment is that a width of a crushing gap formed between the two crushing shells can be adjusted in an efficient manner.

According to one embodiment at least one of the inner and outer slide bearings is at least partly arranged inside an interior cavity of a crushing head shaft piston. An advantage of this embodiment is that a short crusher may be designed, still with a relatively long vertical travel length.

According to one embodiment the inner and outer slide bearings are both at least partly arranged inside an interior cavity of the crushing head shaft piston. With both inner and outer slide bearing at least partly arranged inside of the interior cavity of the crushing head shaft piston, and with at least the inner slide bearing having a low height-to-diameter quotient, a very short and compact crusher design may be obtained.

According to one embodiment an inner bearing lining of the inner slide bearing and an outer bearing lining of the outer slide bearing are both arranged on the eccentric. An advantage of this embodiment is that the inner and outer slide bearings will be aligned with each other, such that crushing forces may be transferred from the crushing head shaft to the frame in the most efficient manner, with no, or only limited, uneven load on the bearing linings. The inner and outer bearing linings could be separate bearing linings mounted on the eccentric, and/or could be bearing linings formed in the eccentric itself, if the eccentric is at least partly made from a bearing material.

According to one embodiment at least one of the inner and outer slide bearings comprises at least one lubricant supply groove. An advantage of this embodiment is that efficient lubrication of the slide bearing may be obtained, thereby increasing its life and ability to withstand high-load situations.

According to one embodiment the lubricant supply groove separates the at least one slide bearing into at least a first portion and a second portion. An advantage of this embodiment is that lubricant may be efficiently distributed to the entire slide bearing.

According to one embodiment at least one of the inner and outer slide bearings comprises a first portion having a first diameter, and a second portion having a second diameter, which is smaller than the first diameter. An advantage of this embodiment is that efficient bearing function may be obtained also in a gyratory crusher involving a crushing head shaft and/or an eccentric that has a varying diameter along its length.

According to one embodiment the eccentric is at least partly made from bearing material, the eccentric forming part of at least one of the inner and outer bearings. An advantage of this embodiment is that the number of parts in the crusher may be reduced, since linings of the slide bearings may be at least partly dispensed with.

According to another aspect of the invention, parts or all of the above mentioned problems are solved, or at least mitigated, by an inner slide bearing lining for an inner slide bearing of an eccentric of a gyratory crusher, wherein the inner slide bearing lining has a height-to-diameter quotient, $H1/D1$, of less than 1.0. Preferably the height-to-diameter quotient, $H1/D1$, of the inner slide bearing lining is less than 0.85, more preferably less than 0.75, and even more preferably less than 0.65. Preferably, the height-to-diameter quotient, $H1/D1$, is larger than 0.35. Using such a total height-to-diameter quotient, the total weight of the entire crusher may be reduced by about 2-8%, compared to known crushers, without sacrificing the load resistance of the inner slide bearing.

According to an embodiment, the inner slide bearing lining has a non-uniform thickness so as to define a circular-cylindrical inner surface which is eccentric with respect to a circular-cylindrical outer surface. Such a slide bearing lining allows an adjustable setting of a total eccentricity of the eccentric.

According to yet another aspect of the invention, parts or all of the above mentioned problems are solved, or at least mitigated, by an outer slide bearing lining for an outer slide bearing of an eccentric of a gyratory crusher, wherein the outer slide bearing lining has a height-to-diameter quotient, $H2/D2$, of less than 0.5. Preferably the height-to-diameter quotient, $H2/D2$, of the outer slide bearing lining is less than 0.45, and even more preferably less than 0.40. Preferably, the height-to-diameter quotient, $H2/D2$, is larger than 0.15. Using such a total height-to-diameter quotient, the total weight of the entire crusher may be reduced by about 2-8%, compared to known crushers, without sacrificing the load resistance of the outer slide bearing.

According to one embodiment an inner and/or an outer slide bearing has a Sommerfeld number, S, which is less than 120. Preferably, the Sommerfeld number, S, of the inner and/or outer slide bearing is less than 70, more preferably less than 40, and even more preferably less than 20. Such values of the Sommerfeld number, S, of the slide bearing has been found to improve the capacity of the slide bearing to operate at high crushing loads also at low height-to-diameter quotients $H1/D1$, and $H2/D2$, respectively. Preferably, the Sommerfeld number is higher than 2, more preferably higher than 3, and even more preferably above 4.

According to one embodiment an inner and/or an outer bearing has a relative clearance of between about $2*10^{-4}$ and about $5*10^{-3}$.

According to yet another aspect of the invention a gyratory crusher comprises a crushing head on which a first crushing shell is mounted;

a frame on which a second crushing shell is mounted, which second crushing shell defines, together with the first crushing shell, a crushing gap, an eccentric to which a crushing head shaft, on which the crushing head is mounted, is rotatably connected, the crushing head thereby being arranged to, when the crusher is operated, execute a gyratory movement for crushing material that is introduced in the crushing gap, an inner slide bearing arranged between the eccentric and the crushing head shaft, a hydraulically movable crushing head shaft piston supporting the crushing head shaft, the crushing head shaft piston having an interior cavity, an outer slide bearing arranged between the eccentric and the crushing head shaft piston to allow the eccentric to rotate relative to the crushing head shaft piston, wherein the inner and outer slide bearings are both arranged, at least partly, inside the interior cavity of the crushing head shaft piston, and wherein an inner bearing lining of the inner slide bearing and an outer bearing lining of the outer slide bearing both being arranged on the eccentric.

An advantage of this gyratory crusher is that crushing forces may be transferred from the crushing head shaft to the frame, via the eccentric and the crushing head shaft piston via inner and outer slide bearing linings that are aligned with each other, since they are both arranged on the eccentric, regardless of the present vertical position of the crushing head shaft and the crushing head shaft piston. This increases the crushing forces that may be transferred from the crushing head shaft to the frame, and increases the life of the inner and outer slide bearings.

According to one embodiment at least one of the inner and outer slide bearing linings is a separate bearing lining mounted on the eccentric. According to one embodiment the inner and outer slide bearing linings are both separate bearing linings mounted on the eccentric.

According to one embodiment at least one of the inner and outer slide bearing linings is a bearing lining formed in the eccentric itself, wherein the eccentric is at least partly made from a bearing material. According to one embodiment the inner and outer slide bearing linings are both formed in the eccentric itself.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
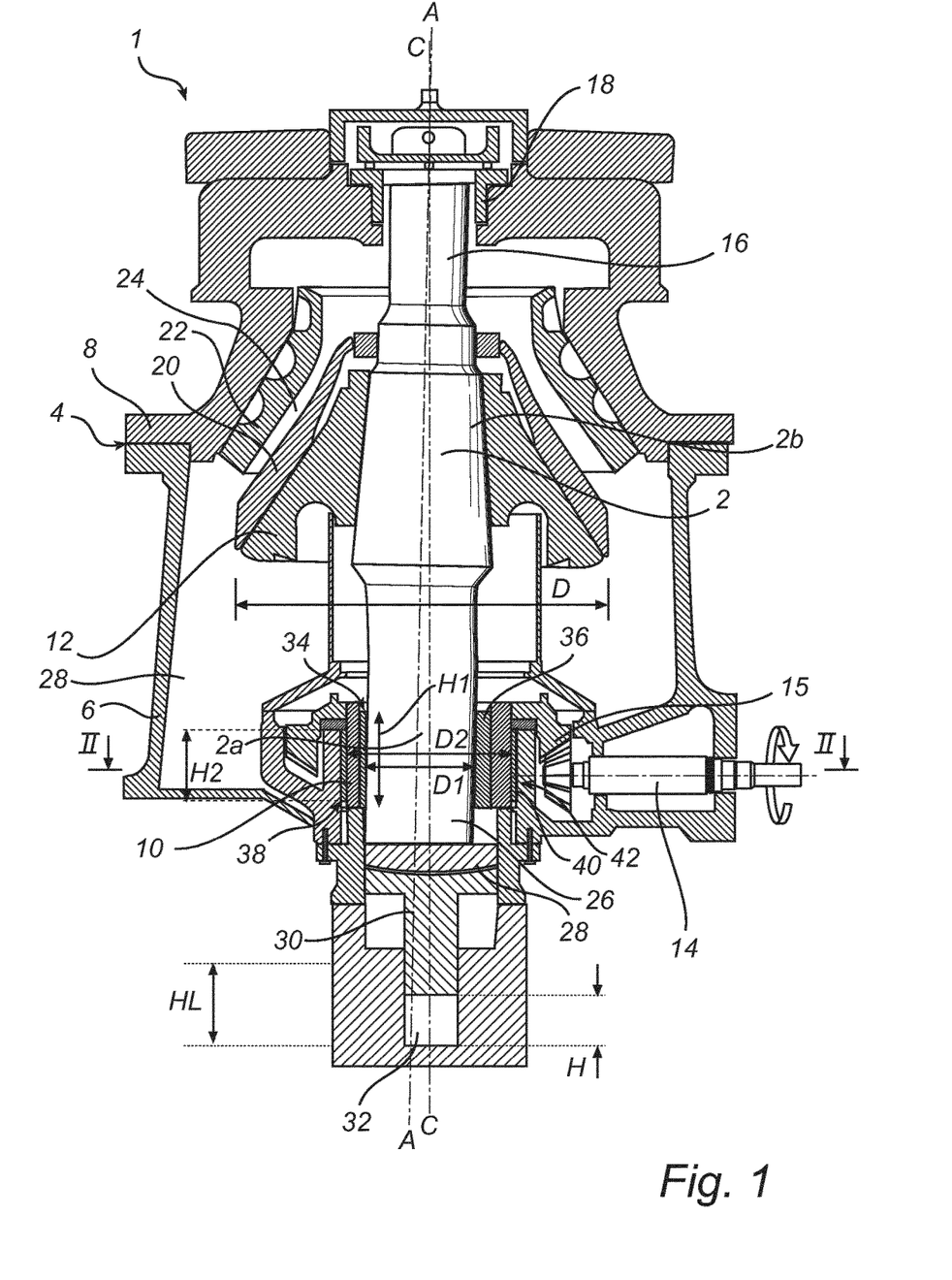
FIG. 1 is a diagrammatic side view in section of a gyratory crusher.

FIG. 1 schematically illustrates a gyratory crusher 1 in section. The gyratory crusher 1 has a vertical crushing head shaft 2 and a frame 4 comprising a frame bottom part 6 and a frame top part 8. An eccentric 10 having in this embodiment the form of an eccentric sleeve 10 is rotatably arranged about the lower portion 2a of the crushing head shaft 2, and a crushing head 12 is mounted on an upper portion 2b of the crushing head shaft 2. A drive shaft 14 is arranged to rotate the eccentric sleeve 10 by means of a motor (not shown) and a gear rim 15 mounted on the eccentric sleeve 10. The crushing head shaft 2 is carried at its upper end 16 in a top bearing 18 in the frame top part 8.

When the drive shaft 14 rotates the eccentric sleeve 10, during operation of the crusher 1, the crushing head shaft 2 and the crushing head 12 mounted thereon will execute a gyrating movement.

An inner crushing shell 20 is mounted on the crushing head 12. An outer crushing shell 22 is mounted on the frame top part 8. A crushing gap 24 is formed between the two crushing shells 20, 22. When the crusher 1 is operated, material to be crushed is introduced in the crushing gap 24 and is crushed between the inner crushing shell 20 and the outer crushing shell 22 as a result of the gyrating movement of the crushing head 12, during which movement the two crushing shells 20, 22 approach one another along a rotating generatrix and move away from one another along a diametrically opposed generatrix.

At its lower end 26 the crushing head shaft 2 is supported on a thrust bearing 28. The thrust bearing 28 is mounted on an upper face of a crushing head shaft piston 30. The vertical position H of the crushing head shaft piston 30 may be hydraulically adjusted by controlling the amount of hydraulic fluid in a hydraulic fluid space 32 at the lower end of the piston 30. Thereby, the width of the crushing gap 24 may be adjusted.

The crushing head shaft 2 is radially supported in the eccentric sleeve 10 via an inner slide bearing 34, which allows the eccentric sleeve 10 to rotate around the crushing head shaft 2. The inner slide bearing 34 may comprise an optional inner bearing lining 36 of a material different from the material of the crushing head shaft 2 and the eccentric sleeve 10. The inner slide bearing 34 is lubricated in a non-illustrated manner.

The eccentric sleeve 10 is radially supported in the frame bottom part 6 via an outer slide bearing 38, which allows the eccentric sleeve 10 to rotate in the frame bottom part 6. The outer slide bearing 38 may comprise an optional outer bearing lining 40, of a material different from the material of the eccentric sleeve 10 and the frame bottom part 6. Together, the inner and outer slide bearings 34, 38 form an eccentric bearing arrangement 42 for guiding the crushing head 12 along a gyratory path.

In accordance with an alternative embodiment the eccentric sleeve 10 may itself be manufactured from a bearing material. In such a case one or both of the inner and outer bearing linings 36, 40 may be made from the same material as the eccentric sleeve 10. According to a further embodiment, one or both of the inner and outer bearing linings 36, 40 may be integral with the eccentric sleeve 10 itself. The latter may, for example, be achieved by a portion of the inner periphery of the eccentric sleeve 10 being arranged for functioning as an inner bearing lining, and/or a portion of the outer periphery of the eccentric sleeve 10 being arranged for functioning as an outer bearing lining.

Returning now to FIG. 1, the outer slide bearing 38 defines an eccentric sleeve axis of rotation C, about which the eccentric sleeve 10 is arranged to rotate. Thereby, the eccentric sleeve axis C also defines the centre of the gyratory motion of the crushing head 12. The eccentric sleeve axis of rotation C is fixed relative to the frame 4. Similarly, the inner slide bearing 34 defines a crushing head axis of rotation A, about which the crushing head 12 is arranged to rotate. The crushing head axis of rotation A is fixed relative to the eccentric sleeve 10, and is inclined and/or offset relative to said eccentric sleeve axis of rotation C, such that the crushing head axis A will gyrate about the eccentric sleeve axis C when the crusher 1 is operated.

Figure 2:
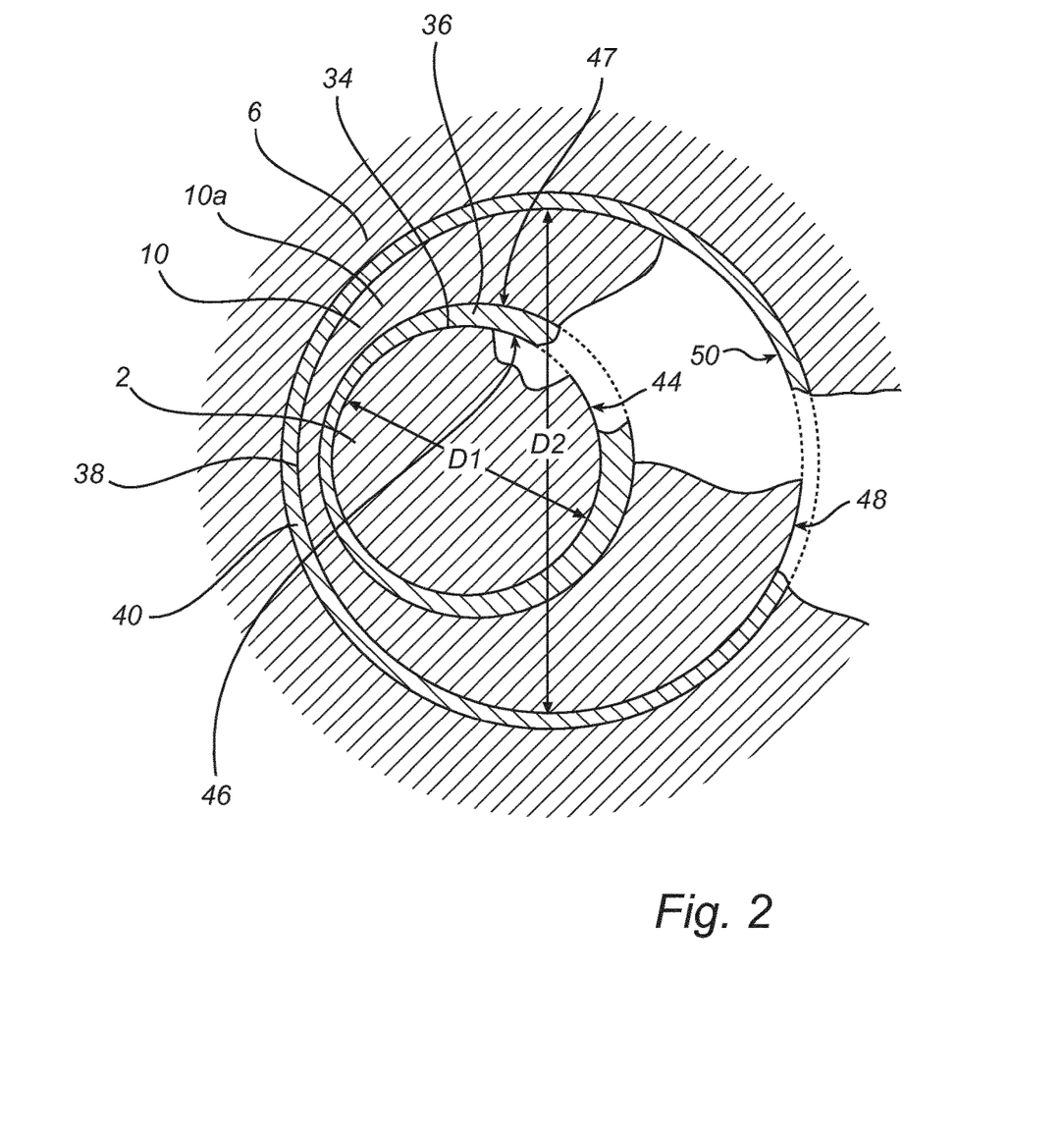
FIG. 2 is a diagrammatic top view of a bearing arrangement of the gyratory crusher, as seen along the section II-II of FIG. 1.

The cross-sectional view of FIG. 2 illustrates the bearing arrangement 42 in greater detail. Starting from the centre, the crushing head shaft 2 has an outer slide surface 44 for sliding along an inner slide surface 46 of the inner bearing lining 36. The inner bearing lining 36 is fit into, and connected to the main body 10a of the eccentric sleeve 10; as such, it forms part of the eccentric sleeve 10. Together, the outer slide surface 44 of the crushing head shaft 2 and the inner slide surface 46 of the eccentric sleeve 10 define said inner slide bearing 34. As illustrated, the inner slide bearing lining 36 may have a non-uniform thickness so as to make the inner slide surface 46 eccentric with respect to a circular-cylindrical outer surface 47 of the inner bearing lining 36. Hence, fine-adjusting of the total eccentricity of the eccentric sleeve 10 may be performed by adjusting the orientation of the inner slide bearing lining 36 in relation to the main body 10a of the eccentric sleeve 10.

The eccentric sleeve 10 has an outer slide surface 48 for sliding along an inner slide surface 50 of the outer bearing lining 40. The outer bearing lining 40 is fit into, and forms part of the frame bottom part 6. Together, the outer slide surface 48 of the eccentric sleeve 10 and the inner slide surface 50 of the frame bottom part 6 define said outer slide bearing 38.

The inner slide bearing 34 has a diameter D1, which is defined as the diameter of the inner slide surface 46 of the eccentric sleeve 10. Similarly, the outer slide bearing 38 has a diameter D2, which is defined as the diameter of the outer slide surface 48 of the eccentric sleeve 10.

Referring back to FIG. 1, the inner slide bearing 34 has a total height H1, defined as the lowest of the total height of the inner slide surface 46 (FIG. 2) of the eccentric sleeve 10 and the total height of the slide surface 44 facing the inner slide surface 46 of the eccentric sleeve 10.

Similarly, the outer slide bearing has a total height H2, defined as the lowest of the total height of the outer slide surface 48 (FIG. 2) of the eccentric sleeve 10 and the total height of the slide surface 50 facing the outer slide surface 48 of the eccentric sleeve 10.

Each of the slide surfaces 44, 46, 48, 50 of the inner and outer slide bearings 34, 38 is, in FIG. 1, illustrated as a single, continuous slide surface. However, clearly, several adjacent, vertically separated slide surface portions may form part of a single, aggregate slide surface; for such an aggregate slide surface, the total height is to be considered as the sum of the heights of the individual slide surface portions.

In accordance with one example, the inner slide bearing 34 may have a total height-to-diameter quotient H1/D1 of about 0.6, and the outer slide bearing 38 may have a total height-to-diameter quotient H2/D2 of about 0.38. Thanks to this the weight, and also the height of the crusher may be significantly reduced. Compared to known crushers, the weight of the bearing arrangement 42, the eccentric sleeve 10, and the frame bottom part 6 may be reduced by 40% or more, using, for example, the total height-to-diameter quotients H1/D1=0.6 and H2/D2=0.38, without sacrificing the load resistance or strength of the inner and outer slide bearings 34, 38. This may typically correspond to a total weight reduction of the entire crusher 1 of about 4-8%, and a height reduction of about 3-6%. Furthermore, the inner and outer slide bearing linings 36, 40 are typically fabricated in a relatively expensive soft metal alloy; the reduction of the height of the bearing linings 36, 40 represents a significant cost saving.

The vertical travel length, depicted with HL in FIG. 1, is the vertical range within which the vertical position of the crushing head 12 can be adjusted by supplying more or less hydraulic fluid to the hydraulic fluid space 32 which supports the thrust bearing 28, the shaft 2, and the crushing head 12 mounted thereon. The vertical travel length HL of the crusher 1 is determined by the hydraulic fluid space 32. For a given size of a gyratory crusher 1 the low inner and/or outer slide bearings 34, 38 described hereinabove make it possible to have a relatively larger vertical adjustability, i.e. stroke, of the crushing head shaft piston 30 arranged in the hydraulic fluid space 32. Hence, as an additional benefit of low inner and/or outer slide bearings 34, 38, for crushers having a crushing gap 24 that is adjustable by vertically adjusting the crushing head 12, an increased vertical travel length HL of the crushing head 12 may be obtained without increasing the height or the weight of the crusher 1. This permits the use of inner and/or outer crushing shell(s) 20, 22 with a greater material thickness, and hence a longer life, since the crushing head 12 may be vertically adjusted along a longer vertical travel length HL as the crushing shells 20, 22 are worn as an effect of the crushing of material. Thicker crushing shells 20, 22 make it possible to operate the crusher 1 with a longer service interval, and/or to increase the crushing power. In order to fully take benefit of the reduced height of the slide bearings 34, 38 by increasing the thickness of the crushing shells 20, 22, a quotient, HL/D, between the maximum vertical travel length HL of the crushing head 12 and the horizontal diameter D of the crushing head 12 exceeds 0.16, more preferably 0.18, and most preferably exceeds 0.24.

Even further, lower inner and/or outer slide bearings 34, 38 result in a reduced bearing friction. The reduced friction may reduce the total power consumption of the bearing arrangement 42 by about 30%, which reduces the cost of operating the crusher 1. Moreover, reduced friction reduces the risk of the crushing head 12 starting to spin at high RPM when no material to be crushed is present in the crushing gap 24.

A low inner bearing 34 also allows a greater tilt of the shaft 2 inside the inner bearing 34 without risking causing damage to the bearing 34. Thereby, a shorter inner bearing 34, i.e. an inner bearing 34 having a short vertical extent, may be better suited to carry higher radial loads than a tall bearing, i.e. a bearing with a long vertical extent, and/or may relieve the requirements on the strength of the crushing head shaft 2, since the bearing 34 will be less sensitive to bending of the shaft 2 or any other type of displacement e.g. caused by machining tolerances.

In fact, it is possible to even further reduce the total height-to-diameter quotient, H1/D1, of the inner slide bearing 34 to less than 0.4, and the total height-to-diameter quotient, H2/D2, of the outer slide bearing 38 to less than 0.3, with maintained load resistance of the respective bearings.

Preferably the height-to-diameter quotient, H1/D1 of the inner slide bearing 34 is less than 1.0. Preferably the height-to-diameter quotient, H1/D1, of the inner slide bearing 34 is less than 0.85, more preferably less than 0.75, and even more preferably less than 0.65. Preferably, the height-to-diameter quotient, H1/D1, is larger than 0.35.

Preferably the outer slide bearing 38 has a height-to-diameter quotient, H2/D2, of less than 0.5. Preferably the height-to-diameter quotient, H2/D2, of the outer slide bearing 38 is less than 0.45, and even more preferably less than 0.40. Preferably, the height-to-diameter quotient, H2/D2, is larger than 0.15.

Preferably, for reliable operation, each of the inner and outer bearings 34, 38 has a relative clearance of between about $2*10^{-4}$ and about $5*10^{-3}$, respectively. By way of example, a diameter D1 of the inner slide bearing 34 may be 300 mm. By multiplying such diameter D1 by a suitable relative clearance a diametral clearance, in mm, can be obtained. For a diameter D1 of 300 mm, and a relative clearance $\xi$ of $3*10^{-3}$ a diametral clearance of the inner slide bearing 34 may, for example, be $3*10^{-3}*300$ mm=0.9 mm.

The Sommerfeld number, S, described in, for example, Shigley, Joseph Edward; Mischke, Charles R. (1989). *Mechanical Engineering Design*. New York: McGraw-Hill, page 483, is a number that takes into account both the physical features of a slide bearing and the conditions under which the slide bearing operates. Each of the inner and outer slide bearings 34, 38 may preferably have a Sommerfeld number, S, which is less than 120. Preferably, the Sommerfeld number, S, of each of the inner and outer slide bearings 34, 38 is less than 70, and more preferably the Sommerfeld number, S, is less than 40, and even more preferably the Sommerfeld number, S, is less than 20. Such values of the Sommerfeld number, S, of the slide bearings 34, 38 have been found to improve the capacity of the slide bearings 34, 38 to operate at high crushing loads also at low height-to-diameter quotients H1/D1, and H2/D2, respectively. Preferably, the Sommerfeld number is higher than 2, and more preferably higher than 3, and even more preferably above 4, since a lower Sommerfeld number tends to increase the investment and operating costs. Thereby, the bearing will be suited for a lubricant having a typical viscosity, according to the ISO-VG scale, of between 100 and 460.

A typical RPM of the crusher 1, when operated, may be between about 150 rpm and about 500 rpm as measured at the eccentric sleeve 10; the RPM may typically be selected so as to obtain a sliding speed in each of the inner and outer slide bearings of between about 2 m/s and about 20 m/s.

Figure 3:
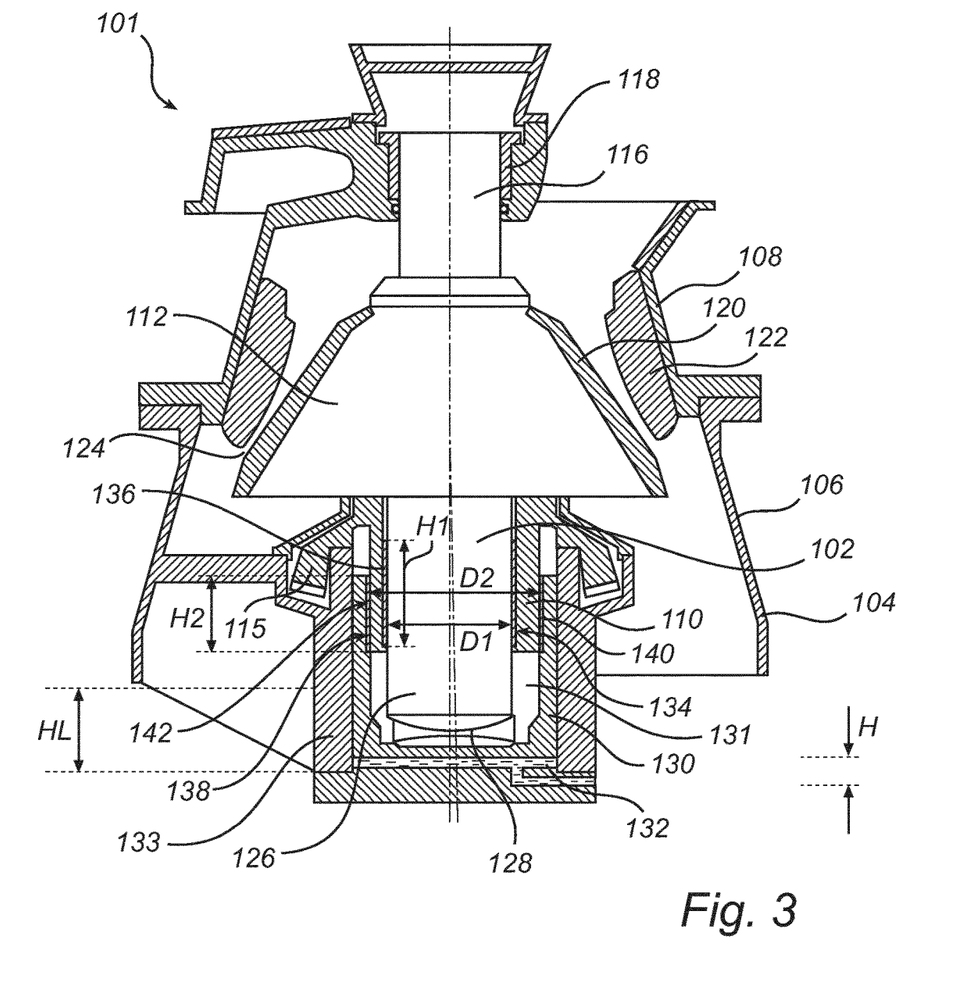
FIG. 3 is a diagrammatic side view in section of a gyratory crusher according to an alternative embodiment.

FIG. 3 schematically illustrates a gyratory crusher 101 in section and according to an alternative embodiment. One difference between the gyratory crusher 101 and the gyratory crusher 1 described hereinbefore with reference to FIG. 1 is that in the gyratory crusher 101 an inner slide bearing 134 and an outer slide bearing 138 are at least partly arranged inside of a crushing head shaft piston 130. The crushing head shaft piston 130 has a shape similar to that of a "bucket" and has an interior cavity 131 in which the slide bearings 134, 138 are at least partly received. This results in a gyratory crusher 101 with a low height. The gyratory crusher 101 has a vertical crushing head shaft 102 and a frame 104 comprising a frame bottom part 106 and a frame top part 108. An eccentric 110, having the form of a sleeve, is rotatably arranged about the crushing head shaft 102 and is provided with a gear rim 115 by means of which the eccentric 110 may be rotated by means of drive shaft and motor (not shown). The eccentric 110 is at least partly arranged inside the interior cavity 131 of the crushing head shaft piston 130. A crushing head 112 is mounted on the crushing head shaft 102 and carries an inner crushing shell 120. The crushing head shaft 102 is carried at its upper end 116 in a top bearing 118 mounted in the frame top part 108. When the eccentric sleeve 110 rotates during operation of the crusher 101, the crushing head shaft 102 and the crushing head 112 mounted thereon will execute a gyrating movement.

An outer crushing shell 122 is mounted on the frame top part 108 and forms together with the inner crushing shell 120 a crushing gap 124 in which material is crushed during operation of the crusher 101 as a result of the gyrating movement of the crushing head 112.

At its lower end 126 the crushing head shaft 102 is supported on a thrust bearing 128. The thrust bearing 128 is mounted in the cavity 131 of the "bucket" shaped crushing head shaft piston 130. The "bucket" shaped crushing head shaft piston 130 is arranged in a hydraulic cylinder 133. The hydraulic cylinder 133 comprises a hydraulic fluid space 132 arranged between the lower end of the piston 130 and the bottom of the hydraulic cylinder 133. The vertical position H of the crushing head shaft piston 130 may be hydraulically adjusted by controlling the amount of hydraulic fluid in the hydraulic fluid space 132. Thereby, the width of the crushing gap 124 may be adjusted.

The crushing head shaft 102 is radially supported in the eccentric sleeve 110 via the inner slide bearing 134, which allows the eccentric sleeve 110 to rotate around the crushing head shaft 102. The crushing head shaft 102 may also slide in a vertical direction in the inner slide bearing 134 as an effect of varying amounts of hydraulic fluid being supplied to the hydraulic fluid space 132. The inner slide bearing 134 may comprise an optional inner bearing lining 136. The inner slide bearing 134, and the inner bearing lining 136, if any, are at least partly located inside the "bucket" shaped crushing head shaft piston 130.

The eccentric sleeve 110 is radially supported in the "bucket" shaped crushing head shaft piston 130 via the outer slide bearing 138, which allows the eccentric sleeve 110 to rotate inside of the crushing head shaft piston 130. Also the outer slide bearing 138 may comprise an optional outer bearing lining 140. Together, the inner and outer slide bearings 134, 138 form an eccentric bearing arrangement 142 for guiding the crushing head 112 along a gyratory path. The eccentric bearing arrangement 142 functions according to similar principles as has been described hereinabove with regard to the bearing arrangement 42 and with reference to FIG. 2.

The inner slide bearing 134 has a total height H1 which is defined in a similar manner as the total height H1 of the slide bearing 34, and the outer slide bearing 138 has a total height H2, which is defined in a similar manner as the total height H2 of the slide bearing 38, as described hereinbefore.

In accordance with one example, the inner slide bearing 134 may have a total height-to-diameter quotient H1/D1 of about 0.8, and the outer slide bearing 138 may have a total height-to-diameter quotient H2/D2 of about 0.44. Thanks to this the weight, and also the height of the crusher 101 may be significantly reduced, similar as with the crusher 1 described hereinbefore with reference to FIG. 1. Furthermore, the inner and outer slide bearing linings 136, 140 are typically fabricated in a relatively expensive soft metal alloy; the reduction of the height of the bearing linings 136, 140 represents a significant cost saving.

The vertical travel length, depicted with HL in FIG. 3, is the vertical range within which the vertical position of the crushing head 112 can be adjusted by supplying more or less hydraulic fluid to the hydraulic fluid space 132 which supports the crushing head shaft piston 130, the thrust bearing 128, the shaft 102, and the crushing head 112 mounted thereon. The vertical travel length HL of the crusher 102 is determined by the hydraulic fluid space 132 and the slide bearings 134, 138 and is increased in the crusher 101 compared to prior art crushers due to the relatively lower height of the bearings 134, 138.

Preferred values of the height-to-diameter quotient, H1/D1, of the inner slide bearing 134, and of the height-to-diameter quotient, H2/D2, of the outer slide bearing 138 are similar as the values for the slide bearings 34, 38 described hereinbefore.

Figure 4:
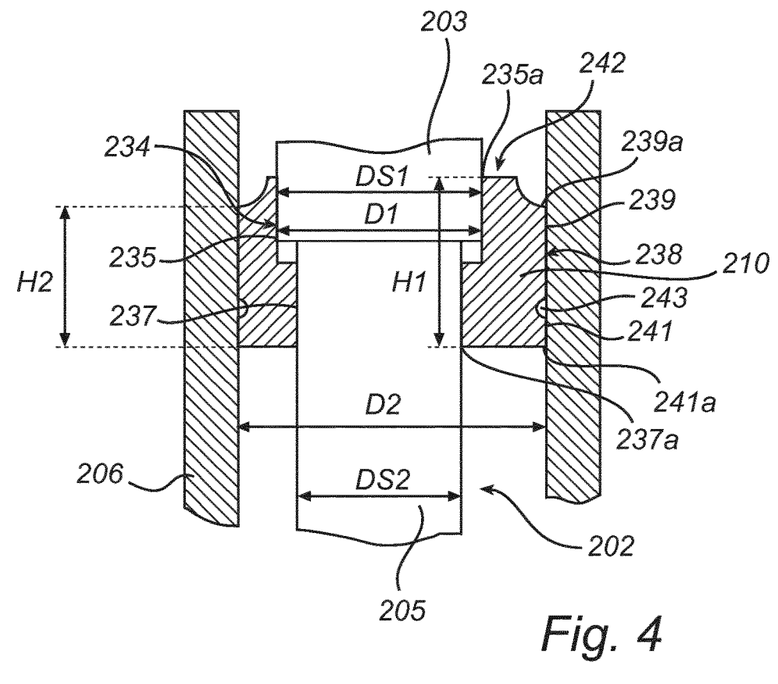
FIG. 4 illustrates a further alternative bearing arrangement.

FIG. 4 illustrates a further embodiment of an eccentric bearing arrangement 242 for guiding a crushing head of a gyratory crusher along a gyratory path. In FIG. 4 the details of the gyratory crusher, including inner and outer crushing shells, crushing head, frame, etc. are not shown in detail. It will be appreciated, however, that the bearing arrangement 242 described herein-after with reference to FIG. 4 could replace the bearing arrangements 42, 142, respectively, of the gyratory crushers 1, 101 described hereinbefore with reference to FIGS. 1 and 3, respectively. The bearing arrangement 242 could be used in other types of gyratory crushers as well.

The bearing arrangement 242 which is illustrated in FIG. 4 comprises an inner slide bearing 234 and an outer slide bearing 238. A crushing head shaft 202, partially shown in FIG. 4, is radially supported in an eccentric sleeve 210 via the inner slide bearing 234, which allows the crushing head shaft 202 to rotate in the eccentric sleeve 210, and to move in a vertical direction when the vertical position of the head shaft 202 is adjusted.

The eccentric sleeve 210 is radially supported in a frame bottom part 206 via the outer slide bearing 238, which allows the eccentric sleeve 210 to rotate relative to the frame bottom part 206 and the frame, not shown in FIG. 4, of the gyratory crusher. Hence, the inner and outer slide bearings 234, 238 together form the eccentric bearing arrangement 242 for guiding a crushing head mounted on the crushing head shaft 202 along a gyratory path. The eccentric sleeve 210 is made from a bearing material in itself, and hence the sleeve 210 performs the technical functions in the outer slide bearings 234, 238 that would normally be attributed to bearing linings. For example, the eccentric sleeve 210 may be at least partly made from bronze.

The crushing head shaft 202 has a first diameter DS1 at an upper portion 203 of the crushing head shaft 202, and a second diameter DS2 at a lower portion 205 of the crushing head shaft 202. The first diameter DS1 is larger than the second diameter DS2. The inner slide bearing 234 has a first, upper, portion 235 that matches with the upper portion 203 of the crushing head shaft 202 and has the diameter DS1, and a second, lower, portion 237 that matches with the lower portion 205 of the crushing head shaft 202 and has the diameter DS2.

The inner slide bearing 234 has a total height H1 which extends from an upper end 235a of the upper portion 235 to a lower end 237a of the lower portion 237. The total height H1 of the inner slide bearing 234 is related to a diameter D1, which is equal to DS1 and is the largest diameter of the inner slide bearing 234. In accordance with one example the inner slide bearing 234 may have a total height-to-diameter quotient H1/D1 of about 0.70.

The outer slide bearing 238 has a first, upper, portion 239 and a second, lower, portion 241. A lubricant supply groove 243 separates the first, upper, portion 239 from the second, lower, portion 241. The lubricant supply groove 243 is arranged for supplying lubricating fluid, such as hydraulic oil, to the upper and lower portions 239, 241.

The outer slide bearing 238 has a total height H2 which extends from an upper end 239a of the upper portion 239 to a lower end 241a of the lower portion 241. The total height H2 of the outer slide bearing 238 is related to a diameter D2, which is the diameter of the outer slide bearing 238. In accordance with one example the outer slide bearing 238 may have a total height-to-diameter quotient H2/D2 of about 0.42.

Preferred values of the height-to-diameter quotient, H1/D1, of the inner slide bearing 234, and of the height-to-diameter quotient, H2/D2, of the outer slide bearing 238 are similar as the values for the slide bearings 34, 38 described hereinbefore.

In the embodiment of FIG. 4 the inner slide bearing 234 has a first, upper, portion 235 and a second, lower, portion 237, wherein the first portion 235 has a diameter DS1 which is different from a diameter DS2 of the second portion 237. It will be appreciated that, in accordance with an alternative embodiment, the first portion 239 of the outer slide bearing 238 could have a different diameter than the second portion 241 of the outer slide bearing 238. In such an alternative embodiment, the frame bottom part 206 would be provided with portions of different diameters to match the respective diameters of the first and second portions 239, 241 of the outer slide bearing 238. In accordance with a yet further embodiment the first and second portions 235, 237 of the inner slide bearing 234 could have the same diameter. Hence, each one of the inner and outer slide bearings 234, 238 could be provided with first and second portions having the same or different diameters.

Figure 5:
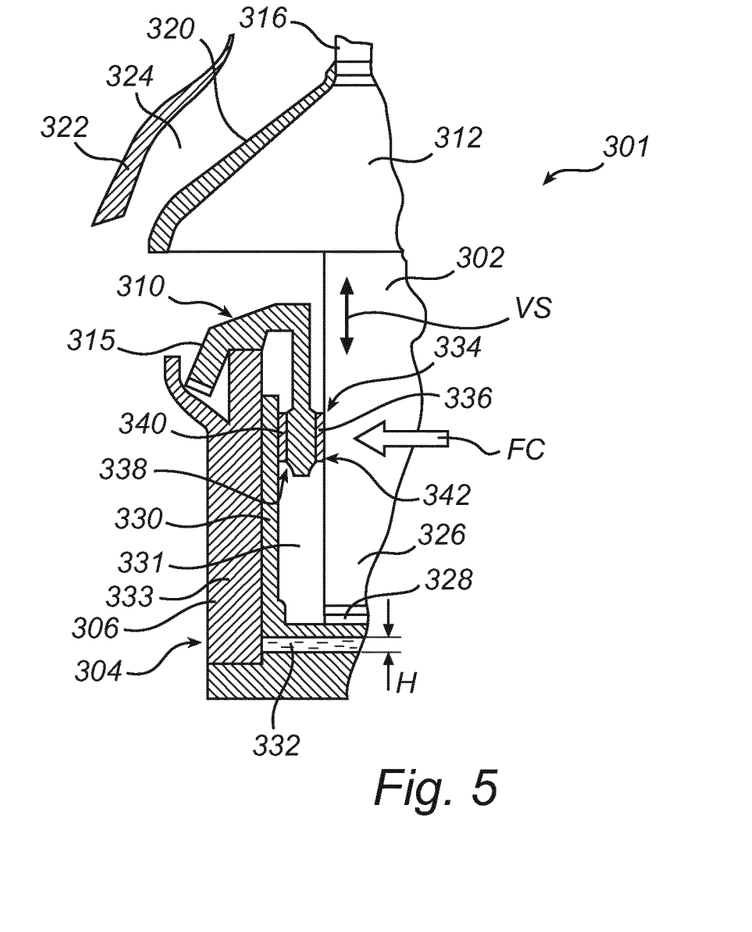
FIG. 5 illustrates a still further alternative bearing arrangement.

FIG. 5 schematically illustrates a gyratory crusher 301 in section and according to a further alternative embodiment. In FIG. 5 only the left portion of the crusher 301 is shown for reasons of maintaining clarity of illustration. The gyratory crusher 301 works in accordance with a principle that is similar to that of the gyratory crusher 101 described hereinabove with reference to FIG. 3. The gyratory crusher 301 has a vertical crushing head shaft 302 and a frame 304, which is only shown in part in FIG. 5, but which is similar to the frame 104. The frame 304 comprises a frame bottom part 306 and a frame top part, the latter not shown in FIG. 5. An eccentric 310, having the form of a sleeve, is rotatably arranged about the crushing head shaft 302 and is provided with a gear rim 315 by means of which the eccentric 310 may be rotated by means of drive shaft and motor (not shown). The eccentric 310 is at least partly arranged inside an interior cavity 331 of a "bucket" shaped crushing head shaft piston 330. A crushing head 312 is mounted on the crushing head shaft 302 and carries an inner crushing shell 320. The crushing head shaft 302 is carried at its upper end 316 in a top bearing which is not shown in FIG. 5, but which may have a similar design as the top bearing 118 described hereinbefore with reference to FIG. 3. When the eccentric sleeve 310 rotates during operation of the crusher 301, the crushing head shaft 302 and the crushing head 312 mounted thereon will execute a gyrating movement to cause crushing of material in a gap 324 formed between the inner crushing shell 320 and an outer crushing shell 322, the latter being mounted in the not shown top part of the frame 304.

At its lower end 326 the crushing head shaft 302 is supported on a thrust bearing 328 mounted in the cavity 331 of the "bucket" shaped crushing head shaft piston 330. The crushing head shaft piston 330 is arranged in a hydraulic cylinder 333 which comprises a hydraulic fluid space 332 arranged between the lower end of the piston 330 and the bottom of the hydraulic cylinder 333. The vertical position H of the crushing head shaft piston 330 may be hydraulically adjusted by controlling the amount of hydraulic fluid present in the hydraulic fluid space 332. Thereby, the width of the crushing gap 324 may be adjusted in a similar manner as in the crusher 101 described hereinbefore.

The crushing head shaft 302 is radially supported in the eccentric sleeve 310 via an inner slide bearing 334, which allows the eccentric sleeve 310 to rotate around the crushing head shaft 302. The crushing head shaft 302 may also slide in a vertical direction, as indicated by an arrow VS, in the inner slide bearing 334 as an effect of varying amounts of hydraulic fluid being supplied to the hydraulic fluid space 332. Varying amounts of hydraulic fluid supplied to the hydraulic fluid space 332 will, hence, cause the head shaft piston 330 and the crushing head shaft 302 to move in the vertical direction, along arrow VS, while the eccentric sleeve 310 remains in a constant vertical position.

The inner slide bearing 334 may comprise an optional inner bearing lining 336. The bearing lining 336 is mounted on the eccentric 310. Hence, the bearing lining 336 will have a fixed position in the vertical direction, and will not move in the vertical direction as the crushing head shaft 302 moves vertically under the action of the hydraulic cylinder 333.

According to an alternative embodiment, the eccentric 310 is made, in itself, and at least on the inside thereof, from a bearing material. In such a case the reference 336 of FIG. 5 would represent an inner bearing lining portion of the eccentric 310 rather than a separate bearing lining.

Returning to FIG. 5, the inner slide bearing 334, and the inner bearing lining 336, if any, are at least partly located inside the "bucket" shaped crushing head shaft piston 330.

The eccentric sleeve 310 is radially supported in the "bucket" shaped crushing head shaft piston 330 via an outer slide bearing 338, which allows the eccentric sleeve 310 to rotate inside of the crushing head shaft piston 330. Also the outer slide bearing 338 may comprise an optional outer bearing lining 340. The bearing lining 340 is mounted on the eccentric 310. Hence, the bearing lining 340 will have a fixed position in the vertical direction, and will not move in the vertical direction as the "bucket" shaped crushing head shaft piston 330 moves vertically under the action of the hydraulic cylinder 333.

According to an alternative embodiment, the eccentric 310 is made, in itself, and at least on the outside thereof, from a bearing material. In such a case the reference 340 of FIG. 5 would represent an outer bearing lining portion of the eccentric 310 rather than a separate bearing lining.

Together, the inner and outer slide bearings 334, 338 form an eccentric bearing arrangement 342 for guiding the crushing head 312 along a gyratory path.

Since the bearing lining 336 of the inner slide bearing 334 and the bearing lining 340 of the outer slide bearing 338 are both mounted on the eccentric 310, the two bearing linings 336, 340 will always be aligned with each other, regardless of the present vertical position of the "bucket" shaped crushing head shaft piston 330 and of the crushing head shaft 302. As a result the crushing forces, represented by an arrow FC in FIG. 5, will be effectively transferred from the crushing head shaft 302 to the lower frame portion 306 of the frame 304 via the eccentric 310, the bearing linings 336, 340 mounted on the eccentric 310, and the crushing head shaft piston 330. A similar function would occur if one or more of the bearing linings are formed in the eccentric 310 itself, when the latter is made from bearing material.

The fact that the bearing linings 336, 340 are always aligned with each other, due to the fact that they are both mounted on the eccentric 310, reduces the risk of damages to the bearings that could occur when crushing forces are transferred via misaligned bearing linings.

The invention has mainly been described above with reference to a few embodiments. However, as is readily appreciated by a person skilled in the art, other embodiments than the ones disclosed above are equally possible within the scope of the invention, as defined by the appended patent claims.

For example, in the crusher 1 illustrated on the appended drawings, the crushing head shaft 2 is eccentrically journalled in the eccentric sleeve 10 in such a manner that it follows the gyratory motion of the crushing head 12. Thereby, the eccentric sleeve axis of rotation C, which is fixed relative to the frame 4, is defined by the outer slide bearing, and the inner slide bearing defines the crushing head axis A, which coincides with the centre of the crushing head shaft 2. However, the teachings disclosed herein are also valid for crushers that are not provided with a top spider, e.g. crushers having a fixed crushing head shaft. In such a crusher, the eccentric sleeve axis of rotation C, which is fixed relative to the frame, will be defined by the inner slide bearing, which rests upon and coincides with the centre of the crushing head shaft. The crushing head will be mounted onto the outer slide bearing, which defines the crushing head axis A. An exemplary crusher of the type with fixed crushing head shaft is described in US 2003/0136865. Furthermore, the teachings disclosed herein are also valid for crushers that are not provided with a top spider and have a rotating crushing head shaft, such as disclosed in U.S. Pat. No. 3,325,108.

The invention claimed is:

1. A gyratory crusher comprising:
   a crushing head on which a first crushing shell is mounted, the crushing head being mounted on a crushing head shaft which is arranged in a top spider;
   a frame on which a second crushing shell is mounted, the second crushing shell defining, together with the first crushing shell, a crushing gap; and
   an eccentric having an inner slide bearing surface and an outer slide bearing surface, the inner slide bearing surface defining, together with an opposing slide bearing surface, an inner slide bearing, and the outer slide bearing surface defining, together with another opposing slide bearing surface, an outer slide bearing, the eccentric being rotatably connected to the frame so as to allow a rotation about an eccentric axis of rotation relative to the frame, the eccentric axis of rotation being defined by one of said inner and outer slide bearings, the inner slide bearing having an inner bearing lining and the outer slide bearing having an outer bearing lining both arranged on the eccentric, the crushing head being rotatably connected to the eccentric so as to allow a rotation about a crushing head axis relative to said eccentric, the crushing head axis of rotation being defined by the other of said inner and outer slide bearings, wherein the crushing head is arranged to, when the crusher is operated, execute a gyratory movement about the eccentric axis for crushing of material that is introduced in the crushing gap, the crusher having a single respective inner and outer slide bearing each having a diameter (D1, D2) and a total axial height (H1, H2) defined respectively by an axially upper end and an axially lower end, the inner and outer slide bearings having each a respective single continuous slide bearing surface or several vertically separated slide bearing surface portions that form part of an aggregate slide bearing surface, each of the single slide bearing surface or the aggregate slide bearing surface being defined between the axial upper and lower ends, and having a total height-to-diameter quotient (H1/D1) of less than 1.0 and larger than 0.35 and a total axial height to diameter (H2/D2) being less than 0.5 and larger than 0.15.

2. The gyratory crusher according to claim 1, wherein the crushing head is vertically slidable relative to the frame so as to allow changing the width of the crushing gap, wherein a quotient (HL/D) between the maximum vertical travel length (HL) of the crushing head and the horizontal diameter (D) of the crushing head exceeds 0.16.

3. The gyratory crusher according to claim 1, wherein the eccentric axis of rotation is defined by the outer slide bearing, and the crushing head axis of rotation is defined by the inner slide bearing.

4. The gyratory crusher according to claim 1, further comprising a hydraulically movable crushing head shaft piston supporting a crushing head shaft on which the crushing head is mounted.

5. The gyratory crusher according to claim 4, wherein at least one of the inner and outer slide bearings is at least partly arranged inside an interior cavity of the crushing head shaft piston.

6. The gyratory crusher according to claim 4, wherein the inner and outer slide bearings are both at least partly arranged inside an interior cavity of the crushing head shaft piston.

7. The gyratory crusher according to claim 1, wherein at least one of the inner and outer slide bearings includes at least one lubricant supply groove.

8. The gyratory crusher according to claim 7, wherein the groove separates the at least one slide bearing into at least a first portion and a second portion.

9. The gyratory crusher according to claim 1, wherein at least one of the inner and outer slide bearings includes a first portion having a first diameter, and a second portion having a second diameter, which is smaller than the first diameter.

10. The gyratory crusher according to claim 1, wherein the eccentric is at least partly made from a material that is the same as a material of the bearing, the eccentric forming part of at least one of the inner and outer bearings.

11. The gyratory crusher of claim 1, wherein each of the inner and outer slide bearings has a relative clearance, the inner slide bearing lining having a non-uniform thickness so as to define a circular-cylindrical inner surface, which is eccentric with respect to a circular-cylindrical outer surface, and wherein the inner and/or outer slide bearings having a diametral clearance between the respective inner and opposing slide bearing surfaces and the outer and opposing slide bearing surfaces, the diametral clearance being defined as the diameter (D1, D2) of the respective inner and outer slide bearings multiplied by the relative clearance, which is between $2*10^{-4}$ and $5*10^{-3}$.

12. A gyratory crusher comprising a crushing head on which a first crushing shell is mounted, the crushing head being mounted on a crushing head shaft which is arranged in a top spider;

a frame on which a second crushing shell is mounted, the second crushing shell defining, together with the first crushing shell, a crushing gap;

an eccentric to which a crushing head shaft, on which the crushing head is mounted, is rotatably connected, the crushing head thereby being arranged to, when the crusher is operated, execute a gyratory movement for crushing material that is introduced in the crushing gap;

an inner slide bearing arranged between the eccentric and the crushing head shaft;

a hydraulically movable crushing head shaft piston supporting the crushing head shaft, the crushing head shaft piston having an interior cavity;

an outer slide bearing arranged between the eccentric and the crushing head shaft piston to allow the eccentric to rotate relative to the crushing head shaft piston, wherein the inner and outer slide bearings are both arranged, at least partly, inside the interior cavity of the crushing head shaft piston; and an inner bearing lining of the inner slide bearing and an outer bearing lining of the outer slide bearing both being arranged on the eccentric, the inner and outer slide bearings each having a diameter ($D1$, $D2$) and a total axial height ($H1$, $H2$) defined respectively by an axially upper end and an axially lower end, the inner and outer slide bearings having each a respective single continuous slide bearing surface or several vertically separated slide bearing surface portions that form part of an aggregate slide bearing surface, each of the single slide bearing surface or the aggregate slide bearing surface being defined between the axial upper and lower ends, and having a total height-to-diameter quotient ($H1/D1$) of less than 1.0 and larger than 0.35 and a total axial height to diameter ($H2/D2$) being less than 0.5 and larger than 0.15.

13. The gyratory crusher of claim 12, wherein each of the inner and outer slide bearings has a relative clearance, the inner slide bearing lining having a non-uniform thickness so as to define a circular-cylindrical inner surface, which is eccentric with respect to a circular-cylindrical outer surface, and wherein the inner and/or outer slide bearings having a diametral clearance between a respective inner and opposing slide bearing surfaces and a the outer and opposing slide bearing surfaces, the diametral clearance being defined as the diameter ($D1$, $D2$) of the respective inner and outer slide bearings multiplied by the relative clearance, which is between $2*10^{-4}$ and $5*10^{-3}$.

* * * * *